United States Patent
Schroeder et al.

(10) Patent No.: US 6,768,765 B1
(45) Date of Patent: Jul. 27, 2004

(54) HIGH POWER EXCIMER OR MOLECULAR FLUORINE LASER SYSTEM

(75) Inventors: Thomas Schroeder, Göttingen (DE); Rustem Osmanow, Rosdorf (DE); Juergen Baumler, Osterode (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 10/163,098

(22) Filed: Jun. 4, 2002

Related U.S. Application Data

(60) Provisional application No. 60/296,947, filed on Jun. 7, 2001.

(51) Int. Cl.[7] .................................................. H01S 3/08
(52) U.S. Cl. .............................. 372/103; 372/57; 372/61
(58) Field of Search ................................. 372/57, 58, 59, 372/103, 104, 107, 108, 61, 63

(56) References Cited

U.S. PATENT DOCUMENTS

| | | | | |
|---|---|---|---|---|
| 4,674,099 A | * | 6/1987 | Turner | 372/59 |
| 4,680,771 A | * | 7/1987 | Koseki | 372/107 |
| 4,718,071 A | * | 1/1988 | Steffen | 372/61 |
| 4,723,254 A | * | 2/1988 | Turner | 372/59 |
| 4,740,982 A | * | 4/1988 | Hakuta et al. | 372/59 |
| 4,993,042 A | * | 2/1991 | Mehmke et al. | 372/103 |
| 5,001,721 A | | 3/1991 | Ludewig et al. | 372/59 |
| 5,001,873 A | * | 3/1991 | Rufin | 451/39 |
| 5,073,896 A | | 12/1991 | Reid et al. | 372/59 |
| 5,111,473 A | | 5/1992 | Rebhan et al. | 372/59 |
| 5,237,583 A | * | 8/1993 | Brimacombe | 372/57 |
| 5,359,620 A | * | 10/1994 | Akins | 372/58 |
| 5,373,523 A | * | 12/1994 | Fujimoto et al. | 372/59 |
| 5,416,791 A | * | 5/1995 | Otani et al. | 372/58 |
| 6,069,909 A | * | 5/2000 | Miller | 372/103 |
| 6,151,350 A | * | 11/2000 | Komori et al. | 372/59 |
| 6,487,229 B2 | * | 11/2002 | Govorkov et al. | 372/57 |
| 6,493,370 B2 | * | 12/2002 | Albrecht et al. | 372/58 |
| 6,567,450 B2 | * | 5/2003 | Myers et al. | 372/55 |
| 2002/0196831 A1 | | 12/2002 | Osmanow et al. | 372/57 |

FOREIGN PATENT DOCUMENTS

| | | | |
|---|---|---|---|
| DE | 44 27 184 A1 | 8/1994 | H01S/3/036 |
| DE | 44 28 210 C2 | 8/1994 | B01D/53/00 |
| DE | 44 41 199 A1 | 11/1994 | H01S/3/036 |

* cited by examiner

*Primary Examiner*—Paul Ip
*Assistant Examiner*—Tuan N. Nguyen
(74) *Attorney, Agent, or Firm*—Stallman & Pollock LLP

(57) ABSTRACT

An excimer or molecular fluorine laser system includes a discharge tube filled with a gas mixture, multiple electrodes within the discharge tube and connected to a discharge circuit for energizing the gas mixture, a resonator for generating a laser beam, and at least one window structure including a first window and a second window. The first window initially seals the discharge tube and transmits the beam. The second window is initially unexposed to the gas mixture. The window structure is configured such that the second window is movable into position for sealing the discharge tube and transmitting the beam when the first window becomes contaminated.

43 Claims, 7 Drawing Sheets

US 6,768,765 B1

HIGH POWER EXCIMER OR MOLECULAR FLUORINE LASER SYSTEM

PRIORITY

This application claims the benefit of priority to U.S. provisional patent application No. 60/296,947, filed Jun. 7, 2001.

BACKGROUND OF THE INVENTION

1. Field of the Invention

The invention relates to a high power laser, and particularly to a high power excimer or molecular fluorine laser having a window structure including multiple windows movable into position for transmitting the laser beam to/from the dicharge chabmer for increasing laser runtime.

2. Discussion of the Related Art

Excimer lasers are used in a wide variety of industrial applications. Among these applications are TFT annealing and photolithography. High power XeCl lasers are particularly used for TFT annealing and KrF, ArF and $F_2$ lasers are particularly used in or are being developed to be used in photolithographic applications. Gas discharges between electrodes in a discharge chamber may be used for energizing a halogen-rich gas mixture filling the discharge chamber, whereby a high power laser beam may be generated by disposing the discharge chamber within an optical resonator.

The discharge chamber has windows on either end so that light can enter and exit the chamber. These windows are exposed to the gas mixture. When the discharges occur between the electrodes, dust and/or other contaminants are produced. These contaminants can adhere to the windows and inhibit the ability of the beam to enter and exit the chamber. When the windows become significantly contaminated, then the windows are cleaned or replaced. The servicing of the laser windows may be performed while another component of the laser is being serviced, such as when a new gas fill is performed. It is desired to increase the lifetime of both the gas mixture and the laser windows to increase the uptime percentage of the laser and thereby increase the throughput of the industrial process for which the laser is being used.

A cryogenic gas circulation loop may be used for preventing contaminants from accessing the laser windows. The cryogenic loop would include an outlet port on the laser tube for removing a small flow of the laser gas mixture from the tube. The removed gas is then circulated through a cryogenic filter such as may be described at U.S. Pat. Nos. 5,136,605, 5,111,473 and/or 5,430,752, which are hereby incorporated by reference, to clean the gas by removing contaminants. The clean gas may then be flowed back into the laser tube at the windows. A gas circulation loop including an electrostatic precipitator filter may also be used preventing contaminant build-up on the laser tube windows, such as may be described at U.S. Pat. No. 4,534,034, which is hereby incorporated by reference, with or without the quiescent zones described in the '034 patent.

There are some disadvantages to using a cryogenic gas circulation loop in this manner. First, if, e.g., liquid helium is used, a helium compressor which converts the helium gas to liquid helium is used. The helium compressor runs at an operating frequency, e.g., 2.4 Hz, that is difficult to damp. It is desired to have a "quiet" gas circulation loop for keeping the laser tube windows clean. Second, when the laser is first initialized for operation, the cryogenic pump takes a significant amount of time to cool down, e.g., around one hour. This cool down period can prolong the downtime of the laser system. It is desired to have a gas circulation loop for cleaning the laser tube windows that does not have a significant cool down period. Third, a cryogenic filter has a limited volume, e.g., around one liter. This limits the gas flow volume through the gas circulation loop, and limits the degree to which the clean gas can be flowed past the laser tube windows. It is desired to have a gas circulation loop with a high clean gas flow volume past the laser tube windows.

It is therefore desired to provide a high power laser which includes a "quiet" gas circulation loop, such as not including a helium compressor, for keeping the laser tube windows clean.

It is further desired to provide a high power laser which includes a gas circulation loop for cleaning the laser tube windows that does not have a significant cool down period.

It is also desired to provide a high power laser which has a gas circulation loop with a high clean gas flow volume past the laser tube windows.

It is further desired to provide a high power laser having improved laser window lifetime and/or gas mixture lifetime.

SUMMARY OF THE INVENTION

An excimer or molecular fluorine laser system is also provided including a discharge tube filled with a gas mixture, multiple electrodes within the discharge tube and connected to a discharge circuit for energizing the gas mixture and a resonator for generating a laser beam. The system further includes at least one window structure including a first window and a second window. The first window initially seals the discharge tube and transmits the beam. The second window is initially unexposed to the gas mixture. The window structure is configured such that the second window is movable into position for sealing the discharge tube and transmitting the beam when the first window becomes contaminated.

The window structure may be further configured for replacing the first window with a third window when the second window is moved into position for sealing the discharge tube and transmitting the beam. The window structure preferably includes a valve for maintaining a seal on the discharge tube when the second window is moved into position for sealing the discharge tube and transmitting the beam. The window structure may be rotatable or translatable for moving the second window into position when the first window becomes contaminated.

The laser system may also include a gas handling unit for replenishing the gas mixture during laser operation and increasing the lifetime of the gas mixture. The laser system may also include an additional gas volume having fluid communication with the gas mixture for increasing a total gas volume and a lifetime of the gas mixture.

The laser system may also include components arranged in a gas circulation loop including the window structure and configured for drawing a flow of the gas mixture from the discharge tube and through the components, and for flowing filtered gas past the first window for preventing contaminants within the discharge tube from depositing on the window. One of the components may include a labyrinth filter and the window structure may include a baffle structure.

A high power excimer or molecular fluorine laser system for industrial processing is provided including a discharge tube filled with a gas mixture including a halogen component, multiple electrodes within the discharge tube and connected to a pulsed discharge circuit for energizing the gas mixture, a resonator for generating a laser beam, at least one window structure including a first window and a second window, wherein the first window initial seals the discharge tube and transmits the beam, and the second window is initially unexposed to the gas mixture, and wherein the window structure is configured such that the second window is movable into position for sealing the discharge tube and transmitting the beam when the first window becomes contaminated, and gas mixture contamination suppression means for suppressing contaminant build-up in the gas mixture, such that a lifetime of the gas mixture is increased, and wherein an interval between laser servicing procedures is increased due to the increased lifetime of the gas mixture and the movement into position of the second window, such that laser system downtime is reduced and industrial throughput is increased.

A method is also provided for generating an excimer or molecular fluorine laser beam such that the laser system generating the beam has an increased interval between laser servicing procedures such that laser system downtime is reduced and industrial throughput is increased. the method includes operating the laser for generating the laser beam which transmits a first window on a discharge tube of the laser, and wherein the first window is exposed to a gas mixture within the discharge tube. the method also includes moving the first window and replacing the first window with a second window which is initially unexposed to the gas mixture. The second window is moved into position for sealing the discharge tube and transmitting the beam when the first window becomes contaminated. The method also includes suppressing contaminant build-up in the gas mixture, such that a lifetime of said gas mixture is increased. The interval between laser servicing procedures is increased due to the moving of the second window into position when the first window becomes contaminated and the increased lifetime of the gas mixture, such that laser system downtime is reduced and industrial throughput is increased.

BRIEF DESCRIPTION OF THE DRAWINGS

FIG. 4b schematically illustrates a cross-sectional top view of the exemplary labyrinth filter of FIG. 4a.

FIG. 4c schematically illustrates an exploded view of the exemplary labyrinth filter of FIG. 4a.

DETAILED DESCRIPTION OF THE PREFERRED EMBODIMENT

Figure 1:
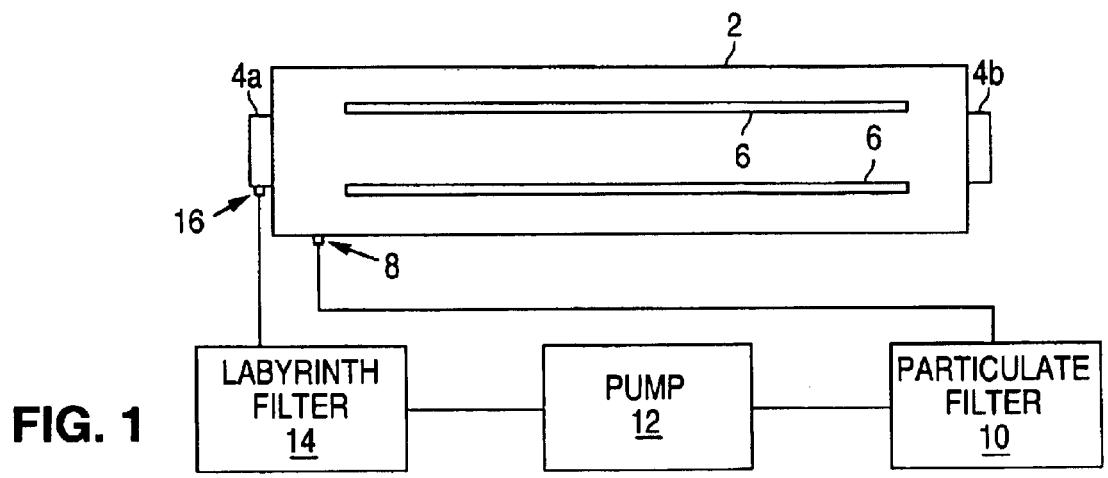
FIG. 1 schematically shows a gas circulation loop connected with a high power laser discharge tube for suppressing contaminant build-up on windows of the discharge tube according to a preferred embodiment.

In preferred embodiments, an excimer or molecular fluorine laser system is provided including a discharge tube filled with a gas mixture, multiple electrodes within the discharge tube and connected to a discharge circuit for energizing the gas mixture, a resonator for generating a laser beam, and at least one window structure including a window for sealing the discharge tube and for transmitting the beam. Multiple components are arranged in a gas circulation loop including the window structure and configured for drawing a flow of the gas mixture from the discharge tube and through the components, and further configured for flowing filtered gas past the window for preventing contaminants within the discharge tube from depositing on the window, wherein one of the components forming the gas circulation loop includes a labyrinth filter, and may further include a particulate filter.

The laser system may also include a gas handling unit for replenishing the gas mixture during laser operation and increasing the lifetime of the gas mixture. The laser system may also include an additional gas volume having fluid communication with the gas mixture for increasing a total gas volume and a lifetime of the gas mixture.

An excimer or molecular fluorine laser system is further provided including a discharge tube filled with a gas mixture, multiple electrodes within the discharge tube and connected to a discharge circuit for energizing the gas mixture and a resonator for generating a laser beam. The system further includes an additional gas volume having fluid communication with the gas mixture for increasing a total gas volume and a lifetime of the gas mixture. The additional gas volume may have a volume of at least 50% of a volume of the gas mixture within the discharge tube for increasing the gas mixture lifetime by at least substantially 50%.

A high power xenon chloride laser system for TFT annealing is also provided including a discharge tube filled with a gas mixture including xenon and hydrogen chloride, multiple electrodes within the discharge tube and connected to a discharge circuit for energizing the gas mixture and a resonator for generating a laser beam having a wavelength around 308 nm and a power of at least 100 Watts. The system further includes a gas handling unit for replenishing the gas mixture during laser operation and increasing a lifetime of the gas mixture.

A high power krypton fluoride laser system for photolithographic processing is further provided including a discharge tube filled with a gas mixture including krypton, molecular fluorine and a buffer gas, multiple electrodes within the discharge tube and connected to a pulsed discharge circuit for energizing the gas mixture, and a resonator for generating a laser beam having a wavelength of around 248 nm. The laser beam includes pulses having energies around 10 mJ at a repetition rate of around 4 kHz, such that the laser beam has a power of around 40 Watts. The system further includes a gas handling unit for replenishing the gas mixture during laser operation and increasing a lifetime of the gas mixture, wherein the gas handling unit is configured to provide micro-halogen injections into the discharge tube for replenishing the halogen in the gas mixture in amounts small enough that parameters of the laser beam are not substantially affected, and wherein the gas handling unit is further configured to release a portion of the gas mixture from the discharge tube in conjunction with the micro-halogen injections.

A high power argon fluoride laser system for photolithographic processing is further provided including a discharge tube filled with a gas mixture including argon, molecular fluorine and a buffer gas, multiple electrodes within the discharge tube and connected to a pulsed discharge circuit for energizing the gas mixture, and a resonator for generating a laser beam having a wavelength of around 193 nm. The laser beam includes pulses having energies around 10 mJ at a repetition rate of around 4 kHz, such that the laser beam has a power of around 40 Watts. The system further includes a gas handling unit for replenishing the gas mixture during laser operation and increasing a lifetime of the gas mixture, wherein the gas handling unit is configured to provide micro-halogen injections into the discharge tube for replenishing the halogen in the gas mixture in amounts small enough that parameters of the laser beam are not substantially affected, and wherein the gas handling unit is further configured to release a portion of the gas mixture from the discharge tube in conjunction with the micro-halogen injections.

A high power excimer or molecular fluorine laser system for industrial processing is further provided including a discharge tube filled with a gas mixture including a halogen component, multiple electrodes within the discharge tube and connected to a pulsed discharge circuit for energizing the gas mixture, and a resonator for generating a laser beam. The system further includes at least one window on the discharge tube for being exposed to the gas mixture and transmitting the laser beam. Window contamination suppression means are included for preventing contaminants within the gas mixture from depositing on the window, such that a lifetime of the window is increased. Gas mixture contamination suppression means are further included for suppressing contaminant build-up in the gas mixture, such that a lifetime of said gas mixture is increased. The interval between laser servicing procedures is advantageously increased due to the increased lifetimes of the window and the gas mixture, such that laser system downtime is reduced and industrial throughput is increased.

A method is further provided for generating an excimer or molecular fluorine laser beam such that the laser system generating the beam has an increased interval between laser servicing procedures such that laser system downtime is reduced and industrial throughput is increased. the includes operating the laser for generating the laser beam which transmits at least one window on a discharge tube of the laser, and wherein the window is exposed to a gas mixture within the discharge tube. The method further includes preventing contaminants within the gas mixture from depositing on the window by circulating gas mixture from the laser tube through a gas circulation loop including a filter and flowing the filtered gas past the window, such that a lifetime of said window is increased. The method further includes suppressing contaminant build-up in the gas mixture, such that a lifetime of said gas mixture is increased. The interval between laser servicing procedures is increased due to the increased lifetimes of the window and the gas mixture, such that laser system downtime is reduced and industrial throughput is increased.

FIG. 1 schematically shows a gas circulation loop connected with a high power laser discharge tube 2 for suppressing contaminant build-up on windows 4a, 4b of the discharge tube 2 according to a preferred embodiment. FIG. 1 shows a laser discharge tube 2 including a pair of electrodes 6 connected to a discharge circuit (not shown) for energizing a gas mixture that is filled within the tube 2. FIG. 1 further shows a gas circulation loop including an outlet port 8 connected to the laser tube 2, a particulate filter 10 (e.g., such as a Millipore® filter for retaining particles between 0.003 microns and 0.1 microns, that may be procured from Millipore Corporation of Bedford, Mass.), a pump 12, a labyrinth filter 14 and an inlet port 16 connected to the laser tube near the laser window 4a. An additional inlet (not shown) is preferably provided near the other window 4b, and may be connected to the circulation loop shown in FIG. 1 or may be connected to an additional gas circulation loop.

In operation, the gas flows out of the discharge tube 2 and into the gas circulation loop via the gas outlet 8. The gas flows through the particulate filter 10 for filtering out coarse particulate contaminants from the laser gas. The pump 12 facilitates the flow of the gas through the gas circulation loop. The pump 12 is preferably a diaphragm pump including a piston, bellow and blower, but the pump 12 may be another type of pump such as a rotary vane pump, turbo pump, or another pump known to those skilled in the art. The pump 12 may be alternatively coupled within the case circulation loop before the particulate filter 10 or after the labyrinth filter 14.

The gas also flows through the labyrinth filter 14 and back into the laser gas mixture at inlet port 16. The labyrinth filter 14 includes a complex gas passageway that traps particulates as the gas winds its way through the complex passageway of the filter 14. An exemplary labyrinth filter 14 in accordance with a preferred embodiment is described below with reference to FIGS. 4a–4c. The port 16 is preferably very near the laser tube window 4a so that the clean gas from the gas circulation loop flows past the interior of the window 4a. Preferably the flow of the clean gas past the interior of the window 4a is such that the rest of the gas mixture and particularly dust and/or other contaminants in the gas mixture are prevented from accessing the window 4a a being deposited thereon.

Baffle boxes (not shown) may be provided around the laser tube windows 4a, 4b, wherein the clean gas may be flowed into a baffle box near the window 4a and outward from the window 4a toward the central portion of the laser discharge tube 2. The baffle boxes would preferably include a series of spaced-apart baffle plates each having a cut-out section for permitting the beam to pass through. The clean gas enters the baffle box and flows through the cut-out sections in a direction away from the window and toward the main volume of the discharge tube 2. Contaminants travelling toward the window 4a from the discharge tube 2 tend to drift away from the cut-out sections of the baffle plates due to the flowing gas and may deposit on one of the baffle plates, rather than on the window 4a. The clean gas then flows from left to right in FIG. 1 from the window 4a towards the main volume of the discharge tube 2. The windows 4a, 4b according to this preferred embodiment have an increased lifetime due to enhanced suppression of contaminant build-up on the windows 4a, 4b due to the advantageous gas circulation loop described above.

The system of FIG. 1 is particularly preferred for use with a high power XeCl laser emitting around 308 nm at a power of 100 Watts or more, and preferably between 200–300

Watts, and being pulsed wherein pulses have an energy of around one Joule and the laser is operated at a repetition rate of 100 Hz or more, although the system may be used for other high power excimer lasers, such as a KrF or ArF laser, or for a high power molecular fluorine laser, particularly emitting pulses of lower energy such as less than 100 mJ, and even possibly around 10 mJ for microlithography, while operating at a repetition rate of 1 kHz or more, and preferably 2 kHz–4 kHz or more, such that the laser beam has a power of 10 Watts or more, and may be up to 100 Watts or more for greater repetition rates. It is noted here that each of the embodiments described herein is particularly preferred for these high power XeCl, KrF, ArF or $F_2$ laser systems.

Figure 2:
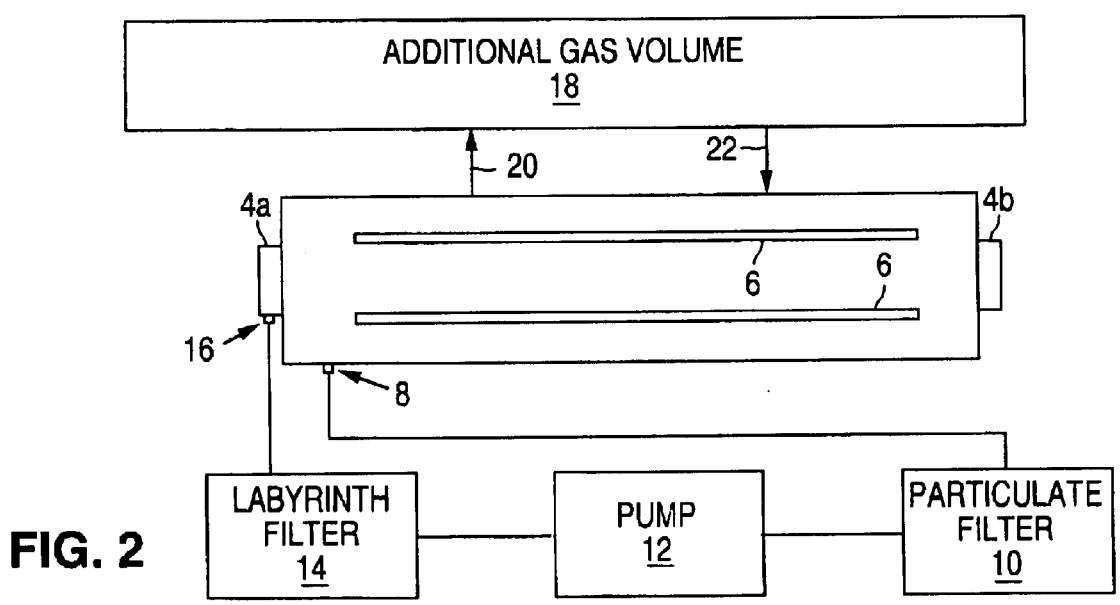
FIG. 2 schematically shows the system of FIG. 1 further including an additional gas volume connected to the discharge tube according to a preferred embodiment.

FIG. 2 schematically shows the system of FIG. 1 further including an additional gas volume 18 connected to the discharge tube 2 according to a variation of the preferred embodiment. As mentioned above, the laser is generally taken down for servicing the laser windows 4a, 4b and for providing a new gas fill into the laser tube 2 when the windows 4a, 4b and the gas mixture in the tube 2 become contaminated to a contaminant tolerance threshold. According to the preferred embodiment described above with reference to FIG. 1, including the particulate filter 10, pump 12 and labyrinth filter 14 of the gas circulation loop, such are also shown at FIG. 2, the windows 4a, 4b have an increased lifetime compared with conventional systems. Thus, if the gas mixture lifetime is also increased, then intervals between servicing of the laser system to replace the gas and/or windows can be advantageously increased.

According to the embodiment shown at FIG. 2, the additional gas volume 18 provides a total amount of laser gas that is significantly increased. The discharge tube 2 may have 50–200 liters of gas therein, while the additional volume may have, e.g., 100 liters of gas therein. Thus, the total gas volume is increased by 100 liters or from 50%–200% of the volume in the discharge tube 2. During operation, gas is flowed from the discharge tube 2 into the additional gas volume 18 through port 20 while gas is flowed from the additional volume 18 into the discharge tube 2 through port 22. A pump (not shown) may be used to facilitate this gas flow. If the contaminant tolerance threshold is a quantity such as contaminants per total gas volume, and the contaminants are substantially evenly distributed throughout the total gas volume include the volume of the discharge tube 2 and the additional volume 18, then the gas lifetime may be increased by the same 50%–200%. If the window lifetime is increased according to the preferred embodiment by a same or greater amount, then the interval between successive laser servicing is advantageously increased by 50%–200%. The gas mixture lifetime may be increased alternatively by other means or in combination with other means such as set forth below with reference to FIG. 5.

In addition to using the additional gas volume 18 with the labyrinth filter 14, pump 12 and particulate filter 10, the additional gas volume 18 can be used will other excimer or molecular fluorine laser arrangements to advantageously increase the gas lifetime. For example, an electrostatic filter may be used in place of the labyrinth filter 14, with or without the particulate filter 10 in the gas circulation loop. Other means for increasing the lifetime of the windows 4a, 4b may be used such as by rotating or translating the windows 4a, 4b so that a first portion of the overall transparent substrates of the windows 4a, 4b is exposed to the laser gas, while a second portion is not exposed, and then the windows 4a, 4b are rotated or translated to expose the second portion and use the second portion for transmitting the light (see also U.S. Pat. No. 4,891,818, which is hereby incorporated by reference). In addition, more than one window may be used, wherein a first window of multiple windows is exposed to the laser gas, while at least a second window of the multiple windows is not exposed, and then the first window is rotated or translated away from being exposed to the laser gas, and the second window is moved into position to be exposed to the laser gas and for transmitting the light.

Figure 3:
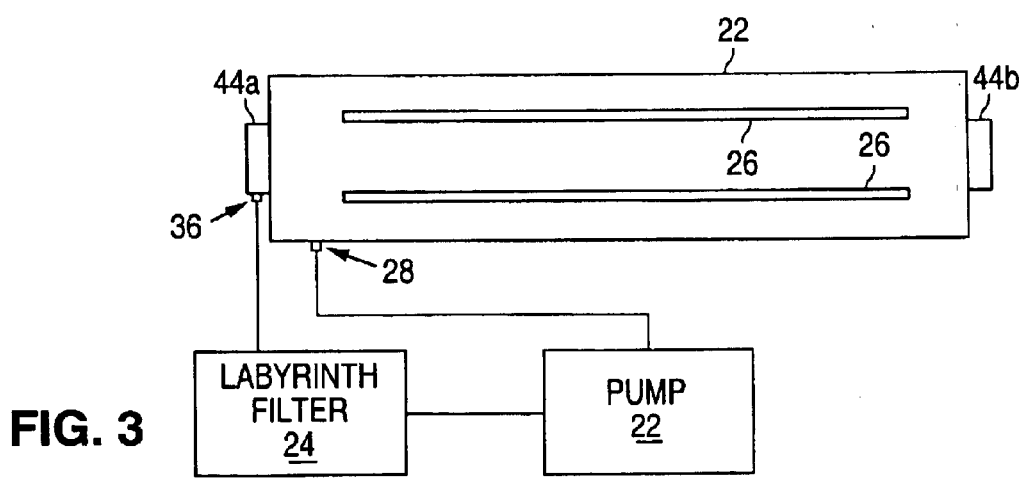
FIG. 3 schematically shows a gas circulation loop connected with a high power laser discharge tube for suppressing contaminant build-up on windows of the discharge tube according to a another preferred embodiment.

FIG. 3 schematically shows a gas circulation loop connected with a high power laser discharge tube 22 for suppressing contaminant build-up on windows 44a, 44b of the discharge tube 22 according to a preferred embodiment. In this embodiment, a gas circulation loop is used including a pump 22 and a labyrinth filter 24 connected by ports 28 and 36, as shown. The gas circulation loop works similarly to that described above with reference to FIG. 1, but the particulate filter of the system of FIG. 1 is not used. The system of FIG. 3 is particularly preferred for use with a KrF, ArF or $F_2$ laser, although the system may be used for other high power excimer lasers such as a XeCl laser.

Figure 4A:
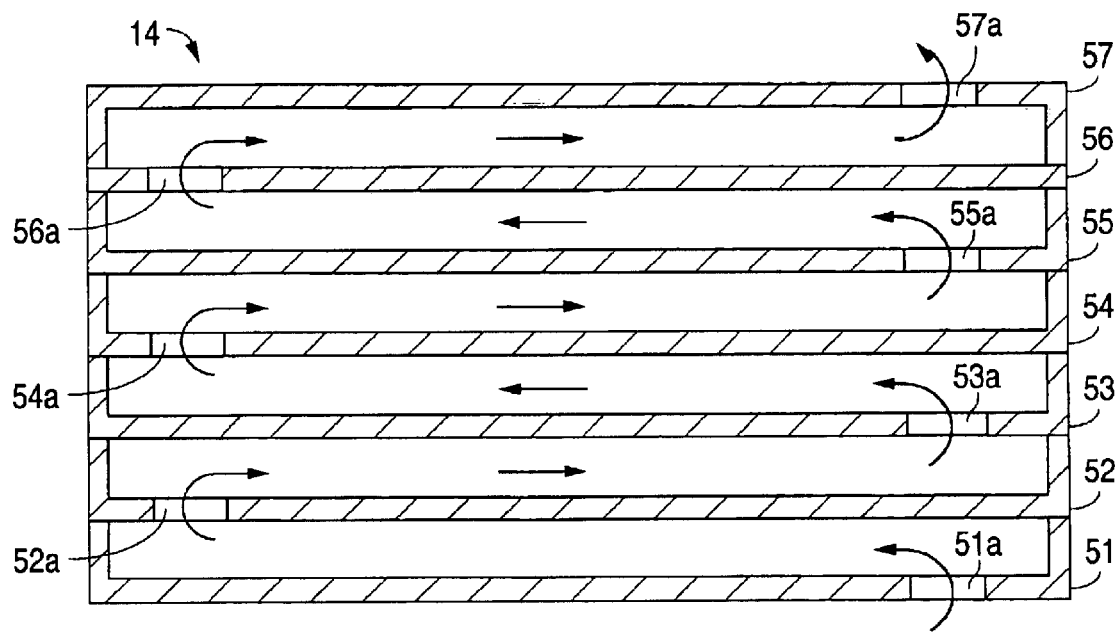
FIG. 4a schematically illustrates a cross-sectional front view of an exemplary labyrinth filter according to a preferred embodiment.

FIG. 4a schematically illustrate, in several views, an exemplary labyrinth filter 14 according to a preferred embodiment. In general, preferably an oblong extended multiplicity of cavities provides a filter, by particle sedimentation, for the laser gas which will be cleaned as it enters and slowly flows through the chambers of the filter 14. The filter has several chambers between which the gas passes through passages which can be holes, sets of holes, continuous slots, etc., and are preferably at opposite ends of adjacent chambers. The chambers may be made of sheet metal (e.g., 1 mm thick). The sheet metal may be break formed or punched or fine-poured. The material may be any of aluminum, stainless steel, Ni, etc. One or more chambers can be magnetic (e.g., No. 6), to remove magnetic particles. One or more chambers can work as an electrostatic dust filter. For this, the applied electrical voltages are preferably around 5 kV with currents of some mA, if the ionization of the dust particle takes place via wires. Electrical isolation may be provided by electrical ceramic-to-metal seals. As mentioned above, a pump 12, such as a diaphragm compressor pump, is preferably used for flowing the gas through the labyrinth filter 14. Alternatively, the fan in the laser tube which circulates the laser gas mixture within the laser tube can also be used for the circulation of the gas through the labyrinth filter 14.

The preferred gas loop including the labyrinth filter 14 may advantageously be used to substantially increase the laser run time or uptime by increasing window pollution intervals (e.g., approximately 100 million pulses or more). Moreover, the preferred gas loop serves to clean the laser gas mixture so that the fewer gas replenishment operations may be performed. Moreover, the preferred gas loop including the labyrinth filter 14 includes an additional gas volume such as may provide the advantages set forth above with reference to FIG. 2 either alternatively to or in combination with the additional volume 18 of FIG. 2.

FIG. 4a schematically illustrates a cross-sectional front view of an exemplary labyrinth filter according to a preferred embodiment. The labyrinth filter 14 includes several compartments 51–57. Each compartment includes a hollow volume filled with the flowing gas. The gas enters each of chamber 51–57 through openings 51a–57a, respectively.

Figure 4B:
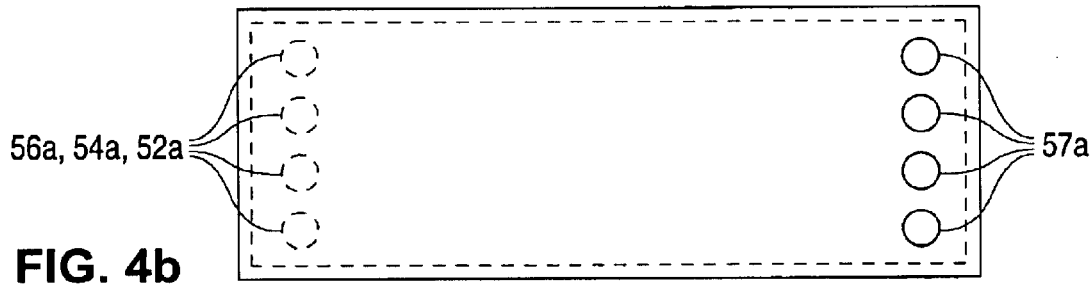
Figure 4C:
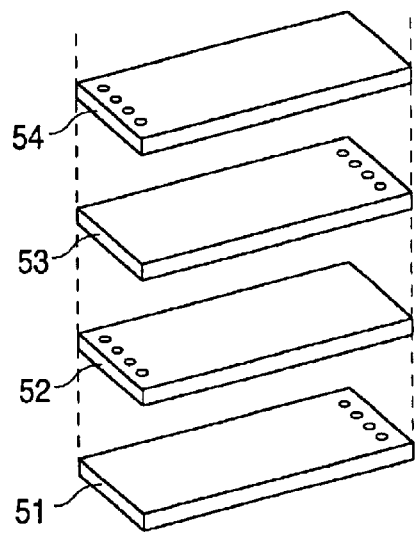

FIG. 4b schematically illustrates a cross-sectional top view of the exemplary labyrinth filter of FIG. 4a. In the example of FIG. 4b, the openings 51a–57a are a series of circular apertures. FIG. 4c schematically illustrates an exploded view of a portion of the exemplary labyrinth filter of FIG. 4a for perspective.

Figure 5A:
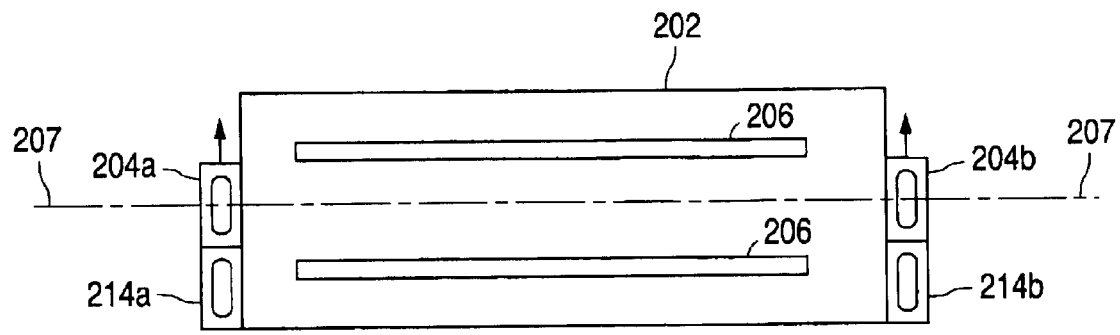
FIGS. 5a–5d schematically illustrate laser discharge tubes 202 having arrangements including two or more windows for online replacement of an exposed and contaminated window with a clean window.
Figure 5B:
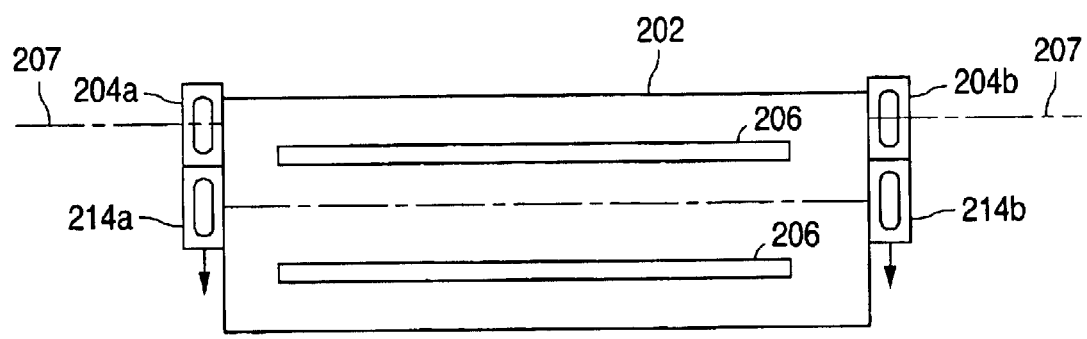

FIGS. 5a through 5d schematically illustrate laser discharge tubes 202 having arrangements including two or more windows for online replacement of an exposed and contaminated window with a clean window. Referring to FIG. 5a, a discharge tube 202 filled with a laser gas mixture which is energized during operation by gas discharge between electrodes 206 and emitting light along an optical axis 207. FIG. 5a shows a first pair of windows 204a, 204b in position to transmit the laser light and being exposed to the gas mixture. When the windows 204a and 204b are contaminated up to the contamination tolerance threshold, then a second pair of windows 214a, 214b are translated into the operating position, as shown in FIG. 5b.

In a further embodiment, the contaminated windows 204a and 204b may be replaced with clean windows while the windows 214a and 214b are being used. In this way, when the windows 214a and 214b are contaminated up to the contamination tolerance threshold, then a third pair of windows (not shown), that have replaced the contaminated windows 204a and 204b in their positions as shown in FIG. 5b, are translated into the operating position. This process can be repeated indefinitely so that the laser windows can be replaced more quickly than taking the system down and replacing the windows during a new fill. Since the conventional procedure can take more than one hour to perform, greater throughput can be realized in the industrial process. A gate valve or other device known to those skilled in the art may be used so that the laser gas is contained in the laser tube 202 while the replacement procedure is being performed.

Figure 5C:
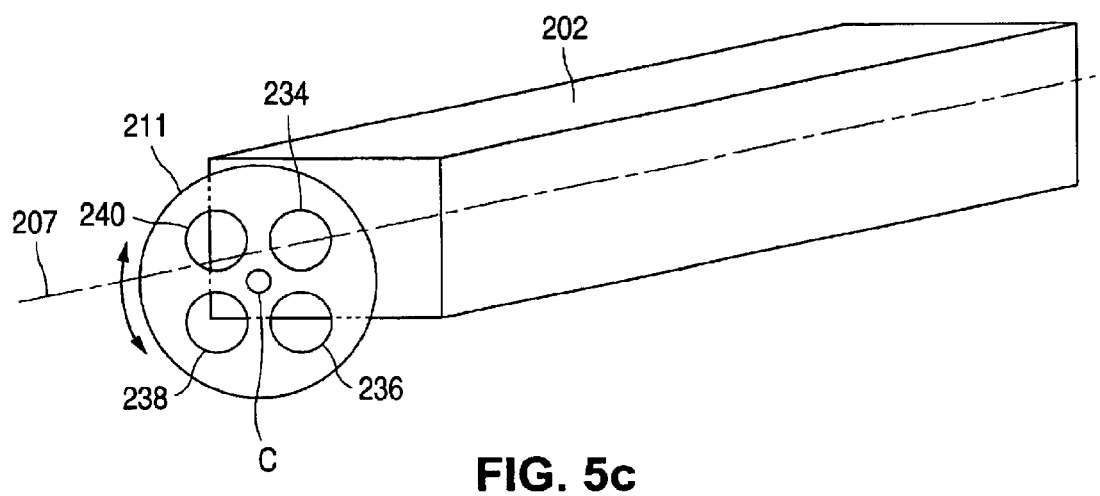
Figure 5D:
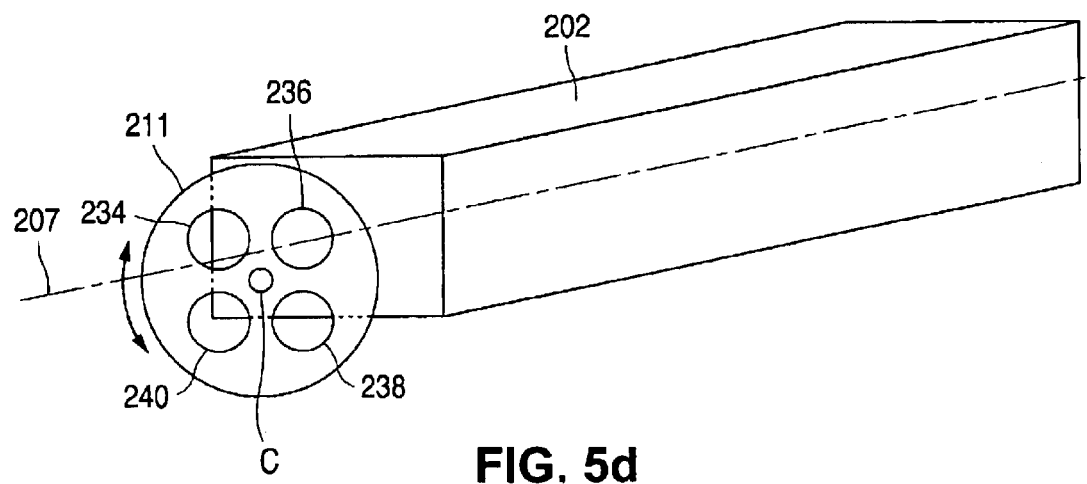

Referring to FIG. 5c, a discharge tube 202 filled with a laser gas mixture which is energized during operation by gas discharge between electrodes and emitting light along an optical axis 207. FIG. 5c shows an apparatus 211 that is rotatable about a center C. The apparatus 211 may be coupled to the laser tube 202 or otherwise mounted in front of the tube 202. FIG. 5c shows a first window 234 that is positioned to transmit light from or into the laser tube 202 and being exposed to the laser gas. The apparatus has three other windows 236, 238 and 240 that are not exposed to the laser gas when window 234 is used for transmitting the light. When the window 234 becomes contaminated up to the contamination tolerance threshold, then the apparatus is rotated so that a second window 236 (or 240) is rotated into the operating position, as shown in FIG. 5d.

In a further embodiment, the contaminated window 234 may be replaced with a clean window in the apparatus 211 while the window 236 is being used. In this way, when each of the windows 234, 236, 238 and 240 become contaminated up to the contamination tolerance threshold, then a clean window (not shown), that has replaced the contaminated window 234 in its position as shown in FIG. 5d, is rotated into the operating position. This process can be repeated with each of the window positions of the apparatus 211 indefinitely so that the laser windows can be replaced more quickly than taking the system down and replacing the windows during a new fill. In this advantageous way, greater throughput can be realized in the industrial process. A gate valve or other device known to those skilled in the art may be used so that the laser gas is contained in the laser tube 202 while the replacement procedure is being performed.

Figure 6:
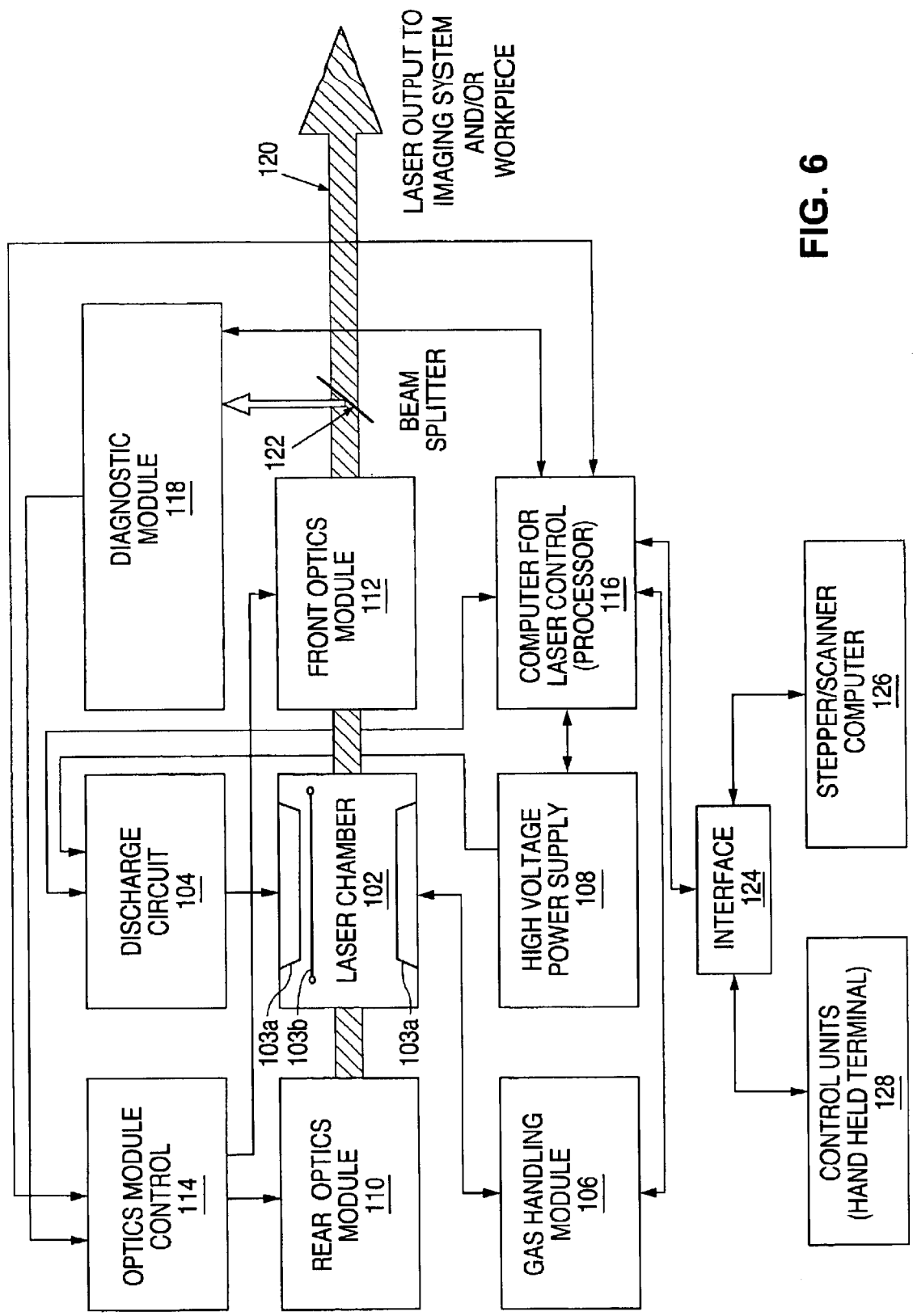
FIG. 6 schematically shows an excimer or molecular fluorine laser system according to a preferred embodiment.

FIG. 6 schematically shows an excimer or molecular fluorine laser system according to a preferred embodiment. The preferred gas discharge laser system is a DUV or VUV laser system, such as an excimer laser system, e.g., ArF, XeCl or KrF, or a molecular fluorine ($F_2$) laser system for use with a deep ultraviolet (DUV) or vacuum ultraviolet (VUV) lithography system, is schematically shown. Alternative configurations for excimer or molecular fluorine laser systems for use in such other industrial applications as TFT annealing, photoablation and/or micromachining, e.g., are described alternatively below and further configurations may be understood by those skilled in the art as being similar to and/or modified from the system shown in FIG. 6 to meet the requirements of that application. For this purpose, alternative DUV or VUV laser system and component configurations are described at U.S. patent applications Ser. Nos. 09/512,417, 09/1694,246, 09/712,877, 09/574,921, 09/738,849, 09/718,809, 09/629,256, 09/712,367, 09/771,366, 09/715,803, 09/738,849, 09/791,431, 09/858,147, 09/741,465, 09/686,483, 09/715,803, 10/081,883,10/036,848, 10.112,660, 10/112,070, 10/001,954, 10/035,351, and 09/780,124, and U.S. Pat. Nos. 6,393,037, 6,389,052, 6,389,048, 6,330,267, 6,269,110, 6,327,290, 6,219,368, 6,243,406, 6,243,405, 6,324,196, 6,381,256, 6,345,065, 6,298,080, 6,285,701, 6,005,880, 6,061,382, 6,020,723, 5,946,337, 6,014,206, 6,157,662, 6,154,470, 6,160,831, 6,160,832, 5,559,816, 4,611,270, 5,761,236, 6,212,214, 6,154,470, and 6,157,662, each of which is assigned to the same assignee as the present application and is hereby incorporated by reference.

The system shown in FIG. 6 generally includes a laser chamber 102 (or laser tube 102 including a heat exchanger and fan for circulating a gas mixture within the chamber/tube 102) having a pair of main discharge electrodes 103a and one or more preionization electrodes 103b connected with a solid-state pulser module 104, and a gas handling module 106. The gas handling module 106 has a valve connection to the laser chamber 102 so that halogen, rare and buffer gases, and preferably a gas additive, may be injected or filled into the laser chamber, preferably in premixed forms (see U.S. patent application Ser. No. 09/513,025, which is assigned to the same assignee as the present application, and U.S. Pat. No. 4,977,573, which are each hereby incorporated by reference) for ArF, XeCl and KrF excimer lasers, and halogen and buffer gases, and any gas additive, for the $F_2$ laser. The gas handling module 106 is particularly preferred when the laser system is used for microlithography applications wherein very high energy stability is desired. Particularly for the high power XeCl laser, the gas handling module may or may not be present in the overall system. The solid-state pulser module 104 is powered by a high voltage power supply 108. A thyratron pulser module may alternatively be used. The laser chamber 102 is surrounded by optics module 110 and optics module 112, forming a resonator. The optics modules 110, 112 may include only a highly reflective resonator reflector in the rear optics module 110 and a partially reflecting output coupling mirror in the front optics module 112, such as is preferred for the high power XeCl laser. The optics modules 110 and 112 may be controlled by an optics control module 114, or may be alternatively directly controlled by a computer or processor 116, particular when line-narrowing optics are included in one or both of the optics modules 110, 112, such as is preferred when KrF, ArF or $F_2$ lasers are used for optical lithography.

The processor 116 for laser control receives various inputs and controls various operating parameters of the system. A diagnostic module 118 receives and measures one or more parameters, such as pulse energy, average energy and/or power, and preferably wavelength, of a split off portion of the main beam 120 via optics for deflecting a small portion of the beam toward the module 118, such as preferably a beam splitter module 122. The beam 120 is preferably the laser output to an imaging system (not shown) and ultimately to a workpiece (also not shown) such as particularly for lithographic applications, and may be output directly to an application process. The laser control computer 116 may communicate through an interface 124 with a stepper/scanner computer, other control units 126, 128 and/or other external systems.

The laser chamber 102 contains a laser gas mixture and includes one or more preionization electrodes 103b in addition to the pair of main discharge electrodes 103a. Preferred main electrodes 103a are described at U.S. patent application Ser. No. 09/453,670 for photolithographic applications, which is assigned to the same assignee as the present application and is hereby incorporated by reference, and may alternatively configured, e.g., for the XeCl laser when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units 103b are set forth at U.S. patent applications Ser. No. 09/692,265 (particularly preferred for KrF, ArF, $F_2$ lasers), Ser. No. 09/532,276 (particularly preferred for the XeCl laser), and Ser. No. 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

The solid-state or thyratron pulser module 104 and high voltage power supply 108 supply electrical energy in compressed electrical pulses to the preionization and main electrodes 103a, 103b within the laser chamber 102 to energize the gas mixture. Components of the preferred pulser module and high voltage power supply may be described at U.S. patent applications Ser. Nos. 09/640,595, 09/838,715, 09/432,348 and 09/858,147, and U.S. Pat. Nos. 6,005,880, 6,226,307, 6,198,761, 6,324,196 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

The laser resonator which surrounds the laser chamber 102 containing the laser gas mixture includes optics module 110 preferably including line-narrowing optics for a line narrowed excimer or molecular fluorine laser such as for photolithography, which may be replaced by a high reflectivity mirror or the like in a laser system wherein either line-narrowing is not desired (XeCl laser for TFT annealling, e.g.), or if line narrowing is performed at the front optics module 112, or a spectral filter external to the resonator is used, or if the line-narrowing optics are disposed in front of the HR mirror, for narrowing the bandwidth of the output beam.

The laser chamber 102 is sealed by windows transparent to the wavelengths of the emitted laser radiation 120. The windows may be Brewster windows or may be aligned at another angle, e.g., 5°, to the optical path of the resonating beam. One of the windows may also serve to output couple the beam.

After a portion of the output beam 120 passes the outcoupler of the optics module 112, that output portion preferably impinges upon a beam splitter module 122 which includes optics for deflecting a portion of the beam to the diagnostic module 118, or otherwise allowing a small portion of the outcoupled beam to reach the diagnostic module 118, while a main beam portion 120 is allowed to continue as the output beam 120 of the laser system (see U.S. patent applications Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 118. A holographic beam sampler, transmission grating, partially transmissive reflection diffraction grating, grism, prism or other refractive, dispersive and/or transmissive optic or optics may also be used to separate a small beam portion from the main beam 120 for detection at the diagnostic module 118, while allowing most of the main beam 120 to reach an application process directly or via an imaging system or otherwise.

The output beam 120 may be transmitted at the beam splitter module while a reflected beam portion is directed at the diagnostic module 118, or the main beam 120 may be reflected, while a small portion is transmitted to the diagnostic module 118. The portion of the outcoupled beam which continues past the beam splitter module is the output beam 120 of the laser, which propagates toward an industrial or experimental application such as an imaging system and workpiece for photolithographic applications.

Particularly for the molecular fluorine laser system, and for the ArF laser system, an enclosure (not shown) may seal the beam path of the beam 120 such as to keep the beam path free of photoabsorbing species. Smaller enclosures may seal the beam path between the chamber 102 and the optics modules 110 and 112 and between the beam splitter 122 and the diagnostic module 118. Preferred enclosures are described in detail in U.S. patent applications Ser. Nos. 09/598,552 and 09/131,580, which are assigned to the same assignee and are hereby incorporated by reference, and U.S. Pat. Nos. 6,327,290, 6,219,368, 5,559,584, 5,221,823, 5,763,855, 5,811,753 and 4,616,908, all of which are hereby incorporated by reference.

The diagnostic module 118 preferably includes at least one energy detector. This detector measures the total energy of the beam portion that corresponds directly to the energy of the output beam 120 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 122 to control the intensity, spectral distribution and/or other parameters of the radiation impinging upon the detector (see U.S. patent applications Ser. Nos. 09/172,805, 09/741,465, 09/712,877, 09/771,013, 60/309,939, and 09/771,366, each of which is assigned to the same assignee as the present application and is hereby incorporated by reference).

One other component of the diagnostic module 118 is preferably a wavelength and/or bandwidth detection component such as a monitor etalon or grating spectrometer (see U.S. patent applications Ser. Nos. 09/416,344, 09/686,483, 60/332,573, 09/975,091 and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831and 5,978,394, all of the above wavelength and/or bandwidth detection and monitoring components being hereby incorporated by reference.

Other components of the diagnostic module may include a pulse shape detector or ASE detector, such as are described at U.S. Pat. Nos. 6,243,405 and 6,243,406 and U.S. patent application Ser. No. 09/842,281, which is assigned to the same assignee as the present application, each being hereby incorporated by reference, such as for gas control and/or output beam energy stabilization, or to monitor the amount of amplified spontaneous emission (ASE) within the beam to ensure that the ASE remains below a predetermined level, as set forth in more detail below. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

The processor or control computer 116 receives and processes values of some of the pulse shape, energy, ASE, energy stability, energy overshoot for burst mode operation, wavelength, spectral purity and/or bandwidth, among other input or output parameters of the laser system and output beam. The processor 116 also controls the line narrowing module to tune the wavelength and/or bandwidth or spectral purity, and controls the power supply and pulser module 104 and 108 to control preferably the moving average pulse power or energy, such that the energy dose at points on the workpiece is stabilized around a desired value. In addition, the computer 116 controls the gas handling module 106 which includes gas supply valves connected to various gas sources. Further functions of the processor 116 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 6, the processor 116 preferably communicates with the solid-state or thyratron pulser module 104 and HV power supply 108, separately or in combination, the gas handling module 106, the optics modules 110 and/or 112, the diagnostic module 118, and an interface 124. The processor 116 may also controls an auxiliary volume (not shown, and different from additional volume 18 of FIG. 2, see U.S. patent application Ser. No. 09/780,120, which is assigned to the same assignee as the present application and is hereby incorporated by reference) which may be connected to a vacuum pump (not shown) for releasing gases from the laser tube 102 for reducing a total pressure in the tube 102 according to preferred embodiments set forth in more detail below. The pressure in the tube 102 may also be controlled by controlling the gas flow through the ports 20, 22 to/from the additional volume 18 of FIG. 2.

The gas mixture lifetime may be advantageously increased other than by or in combination with use of the additional gas volume 18, by using gas replenishment procedures as described below. The discussion below may be supplemented by the description in any of U.S. Pat. No. 6,389,052, and/or U.S. patent applications Ser. Nos. 09/447, 882 and/or 09/780,120, which are assigned to the same assignee as the present application, and/or U.S. Pat. No. 6,212,214, each of which is hereby incorporated by reference.

The laser gas mixture is initially filled into the laser chamber 102 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,243,406, 6,157,162 and 4,977,573 and U.S. patent applications Ser. Nos. 09/513, 025, 09/447,882, and 09/688,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the Ser. No. 09/513,025 application incorporated by reference above. Specifically, for the F2-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%.

Halogen and rare gas injections, including micro-halogen injections of, e.g., 1–3 milliliters of halogen gas, mixed with, e.g., 20–60 milliliters of buffer gas or a mixture of the halogen gas, the buffer gas and a active rare gas, per injection for a total gas volume in the laser tube 102 of, e.g., 100 liters, total pressure adjustments and gas replacement procedures are performed using the gas handling module 106 preferably including a vacuum pump, a valve network and one or more gas compartments. The gas handling module 106 receives gas via gas lines connected to gas containers, tanks, canisters and/or bottles. Some preferred and alternative gas handling and/or replenishment procedures, other than as specifically described herein (see below), are described at U.S. Pat. Nos. 4,977,573, 6,212, 214, 6,389,052, 6,243,406, and 5,396,514 and U.S. patent applications Ser. Nos. 09/447,882, 09/513,025 and 09/688, 561, each of which is assigned to the same assignee as the present application, and U.S. Pat. Nos. 5,978,406, 6,014,398 and 6,028,880, all of which are hereby incorporated by reference. A xenon gas supply may be included either internal or external to the laser system according to the '025 application, mentioned above.

Total pressure adjustments in the form of releases of gases or reduction of the total pressure within the laser tube 102 may also be performed. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred m to as partial, mini- or macro-gas replacement operations, or partial new fill operations, depending on the amount of gas replaced, e.g., anywhere from a few milliliters up to 50 liters or more, but less than a new fill, such as are set forth in the U.S. Pat. No. 6,389,052 patent, incorporated by reference above. As an example, the gas handling unit 106 connected to the laser tube 102 either directly or through an additional valve assembly, such as may include a small compartment for regulating the amount of gas injected (see the '052 patent), may include a gas line for injecting a premix A including 1%$F_2$:99%Ne, and another gas line for injecting a premix B including 1% K:99% Ne, for a KrF laser. For an ArF laser, premix B would have Ar instead of Kr, and for a $F_2$ laser premix B is not used. Thus, by injecting premix A and premix B into the tube 102 via the valve assembly, the fluorine and krypton concentrations (for the KrF laser, e.g.) in the laser tube 102, respectively, may be replenished. Then, a certain amount of gas is released corresponding to the amount that was injected. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, and any and all other gas replenishment actions are initiated and controlled by the processor 116 which controls valve assemblies of the gas handling unit 106 and the laser tube 102 based on various input information in a feedback loop.

These gas replenishment procedures may be used in combination with the gas circulation loops and/or window cleaning procedures of any of FIGS. 1–5*d* to achieve a laser system having an increased servicing interval. The servicing interval for replacing the windows may be extended using the any of the gas circulation loops described above with respect to FIGS. 1–5*d*, while the gas lifetime may be extended using any of the procedures set forth with respect to FIGS. 1–5*d* and/or those discussed with reference to FIGS. 6–8. In principal, according to these preferred embodiments, the laser system may not ever need to consume additional laser processing system downtime for servicing the windows and/or the gas mixture of the laser system, resulting in great advantage in increased throughput for the industrial process for which the laser system is being used.

A general description of the line-narrowing features of embodiments of the laser system particularly for use with photolithographic applications is provided here, followed by a listing of patent and patent applications being incorporated by reference as describing variations and features that may used within the scope of the present invention for providing an output beam with a high spectral purity or bandwidth (e.g., below 1 pm and preferably 0.6 pm or less). Exemplary line-narrowing optics contained in the optics module 110 include a beam expander, an optional interferometric device such as an etalon or otherwise as described in the Ser. Nos. 09/715,803 and/or 10/081,883 applications, incorporated by reference above, and a diffraction grating, which produces a relatively high degree of dispersion, for a narrow band laser such as is used with a refractive or catadioptric optical lithography imaging system. As mentioned above, the front optics module may include line-narrowing optics as well (see the Ser. Nos. 09/715,803, 10/081,883, 09/738,849, and 09/718,809 applications, each being assigned to the same assignee and hereby incorporated by reference).

For a semi-narrow band laser such as is used with an all-reflective imaging system, the grating may be replaced with a highly reflective mirror, and a lower degree of dispersion may be produced by a dispersive prism. A semi-narrow band laser would typically have an output beam linewidth in excess of 1 pm and may be as high as 100 pm in some laser systems, depending on the characteristic broadband bandwidth of the laser.

The beam expander of the above exemplary line-narrowing optics of the optics module 110 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire linenarrowing module may be pressure tuned, such as is set forth in the Ser. Nos. 09/771, 366 and 09/131,580 applications, and the U.S. Pat. No. 6,154,470 patent, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 6,345,065, 6,285,701, 6,393,037, 6,393,040, 6,298,080, 6,381,256, 4,399,540, 4,905,243, 5,226,050, 5,559,816, 5,659,419, 5,663,973, 5,761,236, 6.081,542, 6,061,382, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

Optics module 112 preferably includes means for outcoupling the beam 120, such as a partially reflective resonator reflector. The beam 120 may be otherwise outcoupled such as by an intra-resonator beam splitter or partially reflecting surface of another optical element, and the optics module 112 would in this case include a highly reflective mirror. The optics control module 114 preferably controls the optics modules 110 and 112 such as by receiving and interpreting signals from the processor 16, and initiating realignment or reconfiguration procedures (see the '080, '065, '701, '037, and '470 patents , incorporated by reference above).

The preferred embodiments relate particularly to excimer and molecular fluorine laser systems configured for adjustment of an average pulse energy of an output beam of the laser systems by using gas handling procedures of the gas mixture in the laser tube 102. The halogen and the rare gas concentrations are maintained constant during laser operation by gas replenishment actions for replenishing the amount of halogen, rare gas and buffer gas in the laser tube for KrF and ArF excimer lasers, and halogen and buffer gas for molecular fluorine lasers, such that these gases are maintained in a same predetermined ratio as are in the laser tube 102 following a new fill procedure. In addition, gas injection actions such as $\mu$HIs as understood from the '882 application, mentioned above, may be advantageously modified into micro gas replacement procedures, such that the increase in energy of the output laser beam may be compensated by reducing the total pressure. In contrast, or alternatively, conventional laser systems would reduce the input driving voltage so that the energy of the output beam is at the predetermined desired energy. In this way, the driving voltage is maintained within a small range around $HV_{opt}$, while the gas procedure operates to replenish the gases and maintain the average pulse energy or energy dose, such as by controlling an output rate of change of the gas mixture or a rate of gas flow through the laser tube 102.

Further stabilization by increasing the average pulse energy during laser operation may be advantageously performed by increasing the total pressure of gas mixture in the laser tube up to $P_{max}$. Advantageously, the gas procedures set forth herein permit the laser system to operate within a very small range around $HV_{opt}$, while still achieving average pulse energy control and gas replenishment, and increasing the gas mixture lifetime or time between new fills.

A laser system having a discharge chamber or laser tube 2 with a same gas mixture, total gas pressure, constant distance between the electrodes and constant rise time of the charge on laser peaking capacitors of the pulser module 4, also has a constant breakdown voltage. The operation of the laser has an optimal driving voltage $HV_{opt}$, at which the generation of a laser beam has a maximum efficiency and discharge stability.

It is here noted that modifications of the methods described above may be made. For example, the energy of the laser beam may be continuously maintained within a tolerance range around the desired energy by adjusting the input driving voltage. The input driving voltage may then be monitored. When the input driving voltage is above or below the optimal driving voltage $HV_{opt}$ by a predetermined or calculated amount, then a total pressure addition or release, respectively, may be performed to adjust the input driving voltage a desired amount, such as closer to $HV_{opt}$, or otherwise within a tolerance range of the input driving voltage. The total pressure addition or release may be of a predetermined amount of a calculated amount, such as described above. In this case, the desired change in input driving voltage may be determined to correspond to a change in energy which would then be compensated by the calculated or predetermined amount of gas addition or release, such that similar calculation formulas may be used as those set forth above.

Figure 7:
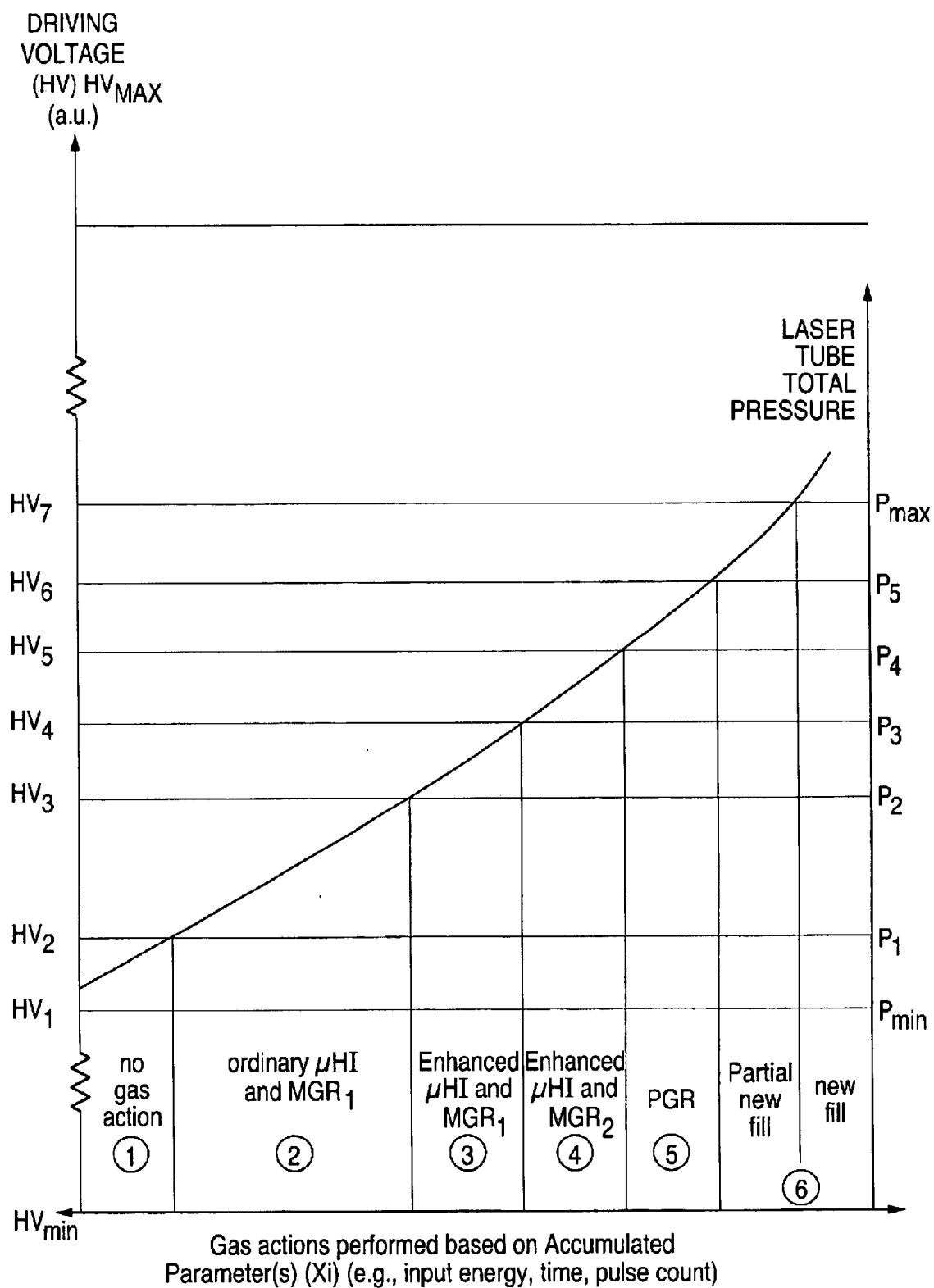
FIG. 7 illustrates several driving voltage levels ($HV_i$) that are defined according to a preferred embodiment, wherein particular gas actions are predetermined to be performed.
Figure 8:
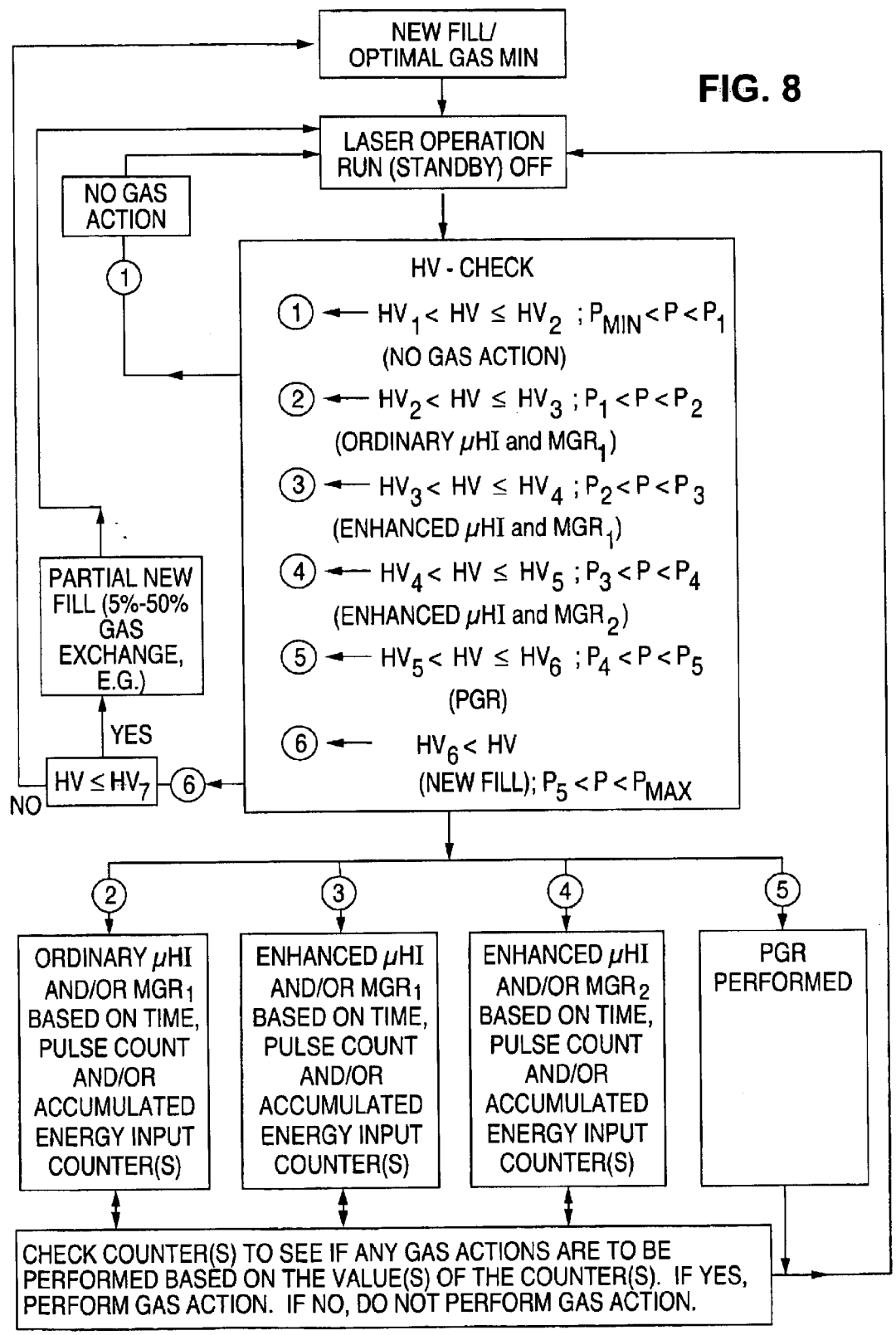
FIG. 8 is a flow diagram for performing ordinary and enhanced $\mu$HIs, MGRs and PGRs in accord with a preferred embodiment and the driving voltage levels set forth at FIG. 6.

Another advantage that may be realized by itself or in combination with reducing the driving voltage variation range, is that a duration between new fills may be extended by utilizing gas replenishment techniques such as halogen injections and gas replacements, preferably in combination with total pressure adjustments, as set forth below. FIGS. 7 and 8 illustrate these advantageous features according to a preferred embodiment.

Referring to FIG. 7, several driving voltage levels ($HV_i$) can be defined wherein particular gas actions are predetermined to be performed. The processor 116 (see FIG. 6) monitors the driving voltage and causes the gas supply unit to perform gas injections of varying degrees, partial and mini gas replacements of varying degrees, and total pressure adjustments of various degrees or in constant amounts, depending on the value of the driving voltage, or which preset range the current operating driving voltage is in (left hand side y-axis of FIG. 7), based on such parameters as time, pulse count and/or total input electrical energy to the discharge, etc. (see the '561 application, mentioned above) (x-axis of FIG. 7).

An example in accord with the present invention is next described with reference to FIG. 7. The laser system is configured to be capable of operating at driving voltages between $HV_{min}$ and $HV_{max}$. The actual operating minimum and maximum driving voltages are set to be in a much smaller range between $HV_1$ and $HV_7$, as illustrated by the broken ordinate axis. An advantage of this preferred embodiment is that the range $HV_1$ to $HV_7$ itself may be reduced to a very small window such that the operating voltage is never varied greatly during operation of the laser. Where this operating range itself lies between $HV_{min}$ and $HV_{max}$, i.e., the actual voltage range (in Volts) corresponding to the range may be adjusted, e.g., to increase the lifetimes of the optical components of the resonator and the laser tube, e.g., such as by adjusting an output energy attenuating gas additive (see the '025 application, mentioned above) or using an extra-resonator attenuator (see U.S. patent application Ser. No. 09/774,238, which is assigned the same assignee and is hereby incorporated by reference). Also advantageously, the operating driving voltage range between $HV_1$ and $HV_7$ may be reduced so that the driving voltage varies less from $HV_{opt}$ than previous systems, while maintaining or extending the lifetime of the laser tube, optics and/or gas mixture between new fills.

The right hand side ordinate axis shows total pressures within the laser tube 102 (see FIG. 6) during a lifetime of the gas mixture (between new fills), and corresponding with driving voltage levels shown on the left hand side ordinate axis. At the lowest driving voltage used in this system, i.e., $HV_1$, the pressure is preferably as low as $P_{min}$. By having a lowest tolerable pressure in the tube when, e.g., a new fill has been recently performed, the driving voltage level $HV_1$ can be higher (and closer to $HV_{opt}$) than for a system operating with a constant total pressure, while providing a same desired average pulse energy.

At the highest driving voltage used in this system, i.e., $HV_7$, the pressure in the tube 102 is preferably as high as $P_{max}$. By having a highest tolerable pressure in the tube when, e.g., the gas mixture is reaching the end of its lifetime before a new fill will be performed, the driving voltage level $HV_7$ can be lower (and closer to $HV_{opt}$) than for a system operating with a constant total pressure, while providing a same desired average pulse energy. Alternatively, the driving voltage range can be extended to provide a longer gas lifetime. Preferably, the total pressure is incremented along with the driving voltage range used as the gas mixture ages, to extend the durations of use of each driving voltage range.

The coordinate axis of FIG. 7 denotes gas actions that may be performed, based on one or more accumulated parameters, when the driving voltage is in each interval. In addition, as is evident from the increasing of the laser tube total pressure shown on the right hand side ordinate axis, pressure additions are also preferably performed as the gas mixture ages, or as the system progresses from left to right on the coordinate axis. The general order of performance of the gas actions is from left to right as the gas mixture ages. However, when each gas action is performed, the driving voltage is checked, and the next gas action that may be performed may correspond to the same driving voltage range, or a different one denoted to the left or the right of that range. For example, after a PGR is performed (when it is determined that the driving voltage is above $HV_5$), the driving voltage may be reduced to between $HV_2$ and $HV_3$, and so the system would return to ordinary $\mu$HI and $MGR_1$ gas control operations. Also, upon performance of a pressure increase, the driving voltage range may be reduced from a higher voltage to a lower voltage range, depending on the state of the system after the pressure increase.

Within the operating range between $HV_1$ and $HV_7$, several other ranges are defined. For example, when the driving voltage HV is between $HV_1$ and $HV_2$ (i.e., $HV_1 < HV < HV_2$), and the total tube pressure is between $P_{min}$ and $P_1$, no gas actions are performed as there is a sufficient amount of halogen in the gas mixture. When the driving voltage is between $HV_2$ and $HV_3$ (i.e., $HV_2<HV<HV_3$), and the total tube pressure is between $P_1$ and $P_2$, $MGR_1$ and ordinary μHI are performed periodically based on the accumulated parameter(s) (i.e., input electrical energy to the discharge, time, and/or pulse count, etc.). This is the ordinary range of operation of the system in accord with the preferred embodiment.

When the driving voltage is between $HV_3$ and $HV_4$ (i.e., $HV_3>HV>HV_4$), and the total tube pressure is between $P_2$ and $P_3$, one or both of the injection amounts of the μhls and the MGRs with corresponding gas releases is increased. In this example, only the μHIs are increased. Thus, the range between $HV_3$ and $HV_4$ in FIG. 7 is the range within which enhanced μHIs are performed, which are preferably halogen injections of greater amount or reduced duration than ordinary μHIs, and the same MGR amounts as in the previous range between $HV_2$ and $HV_3$ are maintained.

To be clear, enhanced μHIs may differ from ordinary μHIs in one or both of two ways. First, the amount per injection may be increased. Second, the interval between successive μHIs may be decreased.

The range between $HV_4$ and $HV_5$ (i.e., $HV_4<HV<HV_5$), and between total tube pressures $P_3$ and $P_4$, represents a new range within which one or both of the injection amounts of the μHIs and the MGRs with corresponding gas releases is increased (or the duration between successive actions is reduced). In this example, only the MGRs are increased as compared with the range $HV_3$ to $HV_4$. Thus, an enhanced amount of halogen gas is injected (with corresponding release of gases) during each $MGR_2$ than the ordinary amount $MGR_1$ when the driving voltage is in the range between $HV_4$ and $HV_5$. Alternatively or in combination with replacing the gas in larger amounts, the mini gas replacements $MGR_2$ are performed at shorter intervals than the $MGR_1$ are performed. In each of the preferred and alternative $MGR_2$ procedures, the contaminants in the discharge chamber are reduced at smaller intervals (e.g., of accumulated input energy to the discharge, pulse count and/or time, among others) compared with the $MGR_1$ procedures that are performed at the lower driving voltage range between $HV_3$ and $HV_4$. The μHIs are also preferably performed periodically in this range to recondition the gas mixture. It is noted here that several ranges wherein either or both of the amounts injected during the μHIs and MGRs is adjusted may be defined each corresponding to a defined driving voltage range. Also, as mentioned above with respect to monitoring the pressure (and optionally the temperature) in the accumulator (and optionally the laser tube), the amount injected may be adjusted for each injection.

When the driving voltage is above $HV_5$ (i.e., $HV_5<HV<HV_6$), a still greater gas replacement PGR is implemented. PGR may be used to replace up to ten percent or more of the gas mixture. Certain safeguards may be used here to prevent unwanted gas actions from occurring when, for example, the laser is being tuned. One is to allow a certain time to pass (such as several minutes) after the $HV_5$ level is crossed before the gas action is allowed to be performed, thus ensuring that the driving voltage actually increased due to gas mixture degradation. When the driving voltage goes above $HV_6$, then it is time for a new fill of the laser tube. It is noted here that the magnitudes of the driving voltages ranges shown in FIG. 7 are not necessarily drawn to scale.

FIG. 8 is a flow diagram for performing ordinary and enhanced μHIs, MGRs and PGRs in accord with the preferred embodiment and the example set forth as FIG. 7. The procedure starts with a new fill, wherein the discharge chamber is filled with an optimal gas mixture. The laser can thereafter be in operation for industrial applications, in stand-by mode or shut off completely. A driving voltage check (HV-check) is performed after the current driving voltage (HV) is measured.

The measured driving voltage (HV) is compared with predetermined values for $HV_1$ through $HV_7$. The processor determines whether HV lies between $HV_1$ and $HV_2$ (i.e., $HV_1<HV<HV_2$) and thus path (1) is followed and no gas actions are to be performed and the procedure returns to the previous step. Although not shown, if the HV lies below $HV_1$, then a procedure may be followed to decrease the halogen concentration in the laser tube, such as by releasing some laser gas and/or injecting some buffer gas from/into the laser tube. Alternatively, if the total pressure is not at or below $P_{min}$, then a pressure release may be performed.

If the processor determines that the HV lies between $HV_2$ and $HV_3$, then the system is within the ordinary operating driving voltage band. If it is within the ordinary operating band, then path (2) is followed whereby ordinary μHIs and $MGR_2$ may be performed based preferably on time, input electrical energy to the discharge and/or pulse count intervals as predetermined by the expert system based on operating conditions. Again each gas action may be adjusted depending on the calculated partial pressure or number of halogen molecules in the laser tube, as described above.

The μHIs and $MGR_1$ performed when path (2) is followed may be determined in accordance with any method set forth in U.S. patent Application Ser. No. 09/588,561, already incorporated by reference. If HV is not within the ordinary operating band, then it is determined whether HV lies below $HV_2$ (i.e., $HV<HV_2$). If HV is below $HV_2$, then path (2) is followed and no gas actions are performed.

If HV lies between $HV_3$ and $HV_4$ (i.e., $HV_3<HV<HV_4$), then path (3) is followed and enhanced μHI and $MGR_1$ may be performed again based on the value or values of the time, pulse count and/or applied electrical energy to the discharge counter(s) being used. The precise amounts and compositions of gases that are injected and those that are released are preferably determined by the expert system and will depend on operating conditions.

If HV lies between $HV_4$ and $HV_5$ (i.e., $HV_4<HV<HV_5$), then path (4) is followed and enhanced μHI and $MGR_2$ may be performed depending on checking the values of the counters. Again, the precise amounts and compositions of gases that are injected and those that are released are preferably determined by the expert system and will depend on operating conditions.

If HV lies between $HV_5$ and $HV_6$ (i.e., $HV_5<HV<HV_6$), then PGR is performed. If HV lies above $HV_6$ (i.e., $HV_6<HV$), then a new fill is performed.

After any of paths (2)–(5) is followed and the corresponding gas actions are performed, and preferably after a specific settling time, the method returns to the step of determining the operating mode of the laser and measuring and comparing HV again with the predetermined HV levels $HV_1$ through $HV_7$.

The setting of all of these different driving voltage and laser tube total pressure levels and time, applied electrical energy to the discharge and/or pulse count schedules can be done individually or can refer to the computer controlled data base where they are stored for different operation conditions. The operation of the laser at different HV-levels under different operation conditions such as continuous pulsing or burst mode may be taken into consideration.

Also in accord with the preferred embodiment, a partial new fill procedure may be performed as shown in FIG. 7. As shown in FIG. 7, an additional HV range is established which lies above the PGR range 5 and yet below the driving voltage threshold value $HV_7$. When the processor determines that the high voltage is above $HV_6$, then either a new fill or a partial new fill will be performed depending on whether the high voltage is at or below $HV_7$ wherein a partial new fill is to be performed, or is above $HV_7$, wherein a total new fill is performed. Alternatively, if the total pressure is still below $P_{max}$, a pressure addition may be performed to extend laser operation until the total pressure reaches $P_{max}$, when total pressure additions are disabled.

When a total new fill is performed, substantially 100% of the gas mixture is emptied from the discharge chamber and a totally fresh gas mixture is introduced into the laser chamber. However, when a partial new fill is performed, only a fraction (5% to 70% or around 0.15 bar to 2 bar, as examples) of the total gas mixture is released. More particularly preferred amounts would be between 20% and 50% or 0.6 bar to 1.5 bar. A specifically preferred amount would be around 1 bar or around 30% of the gas mixture. Experiments have shown that implementing a partial new fill procedure wherein 1 bar is exchanged increases the gas lifetime by as much as five times over not having the procedure.

The amount that may be released is an amount up to which a substantial duration of time is used to get the gas out with a pump, and so the amount may be more than 50%, and yet may take substantially less time than a total new fill. Thus, a partial new fill procedure has the advantage that a large amount of aged gas is exchanged with fresh gas in a short amount of time, thus increasing wafer throughput when the laser is being used in lithographic applications, for example.

Referring now to FIG. 8, when the processor determines that the high voltage is above $HV_6$, a determination is made whether the high voltage is at or below $HV_7$. If the answer is yes, i.e., that the high voltage is at or below $HV_7$, then a partial new fill is initiated, whereby less than substantially 100% of the gas mixture is taken out of the discharge chamber and replaced with fresh gas. Advantageously, the system is only taken offline for a short time compared with performing a total new fill. If the answer is no, i.e., that the high voltage is above $HV_7$, then a new fill is performed. As mentioned, experiments have shown that the gas lifetime can be improved by as much as five times before the new fill range would be reached when the partial new fill procedure is implemented.

It is to be understood that a system not using all of the ranges 1–6 and the new fill/partial new fill procedures of range 6 may be advantageously implemented. For example, in FIG. 7, a system that uses only a single one of the ranges with the partial new fill and new fill may be used, and the gas lifetime improved. With some ranges removed, the partial new fill range may be moved to a lower threshold high voltage. In addition, fewer or more than the total pressure ranges shown may be used, and the pressure ranges may be used more than once over the driving voltage range from $HV_1$ to $HV_7$. For example, the entire total pressure range may be used during one range or fewer than all of the driving voltage ranges, and then the total pressure range from $P_{min}$ to $P_{max}$ may be used again at a higher driving voltage range, and so on. It is preferred that all of the ranges and corresponding gas actions be used for optimum laser system performance.

The combination of all of these different kinds of gas control and replenishment mechanisms involves harmonizing many factors and variables. Combined with the expert system and database, the processor controlled laser system of the preferred embodiment offers an extended gas lifetime before a new fill is necessary. In principle, bringing down the laser system for new fill might be totally prevented. The lifetime of the laser system would then depend on scheduled maintenance intervals determined by other laser components such as those for laser tube window or other optical components exchange. Again, as mentioned above, even the lifetimes of the laser tube and resonator components may be increased to increase the intervals between downtime periods.

During the laser operation, it is important to keep the ratio of the concentrations of the gas components of the gas mixture constant at their desired ratios as set forth above by example for the ArF, KrF and $F_2$ laser systems. The halogen injections preferably compensate not only the depleting of $F_2$ during the laser operation, but also the static degradation of the gas mixture in the laser tube 102 (see FIG. 6), and in any case the degradation of the optical components, too.

If the fluorine level is not monitored and maintained at the desired level, e.g., around 0.1%, then by compensating the aging of the optics and laser tube and contaminant build-up in the laser tube 102, the gas mixture can have a larger amount of fluorine than the desired amount, while the average energy is at the desired level. If this is done, then various laser oscillation parameters can vary from their desired values during the laser operation as a result of the increased fluorine concentration, and the gas lifetime and lifetime of the laser tube can be reduced. It is therefore desired to keep the fluorine concentration constant at the desired value, and to vary the total pressure and driving voltage within its limited range according to the preferred embodiments. The halogen and the rare gas concentrations, particularly, for the ArF and KrF lasers, and the halogen concentration for the $F_2$ laser, are preferably maintained constant during the laser operation, wherein the replenished amounts of halogen and rare gas, and preferably buffer gas, in the laser tube 102 are maintained in the same ratio as just after a new fill procedure.

When pressure releases are performed, the reduction of the total gas pressure in the laser tube 102 is preferably achieved by pumping through an auxiliary volume (not shown, but see the Ser. No. 09/780,120 application, incorporated by reference above). This auxiliary volume is preferably used because the amount of the released gas mixture is very small, and thus a more precise determination of the release amount is desired, compared, e.g., to pumping the laser tube 102 during a new fill or partial new fill.

Many variations are possible according to the preferred embodiments and many alternative embodiments can be understood by those skilled din the art. Micro halogen injections, as described above, may be advantageously replaced with micro replacements or constant replacements of gas mixture, i.e., a pressure release is performed is association with the halogen injection. In this case, the gas procedure may involve working with a single parameter, i.e., a rate at which the gas mixture is changed or a rate of gas flow through the laser tube 102.

This gas flow rate can have a constant value. This value can be preferably as large as possible to extend the lifetime of the gas mixture. In addition, the gas flow rate can be made to depend on the time, pulse count, input energy to the discharge, etc., such that the rate may be increased according to a progression of one or more of these parameters. The gas flow rate may also depend on the duty cycle of the laser, such that, e.g., the rate is increased at higher duty cycles.

In addition, total pressure increases during the laser operation may be performed according to the gas flow rate, such that when the gas flow rate of micro gas replacements exceeds a threshold value, then the pressure is increased. The increasing of total gas pressure in the laser tube 102 may also be made to depend on the high voltage of the laser operation, such as is shown at FIG. 6. The total pressure increases can begin at the start of laser operation, e.g., after a new fill, or can be started some time, pulse count or input energy to the discharge amount after the new fill. The time, pulse count or total input energy to the discharge amount when the pressure increases are started may also depend on the duty cycle. Preferably, the total gas pressure increases themselves increase at a constant value from when they are started, and may depend again on the time, pulse count or total input energy to the discharge from the start of laser operation or the start of the pressure increases, or on the duty cycle or on the driving voltage level or range of operation of the laser system.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. An excimer or molecular fluorine laser system, comprising:
   a resonator including therein a discharge tube filled with a gas mixture;
   a plurality of electrodes within the discharge tube and connected to a discharge circuit for energizing the gas mixture and generating a laser beam in the resonator;
   at least one window structure positioned at an end of the discharge tube, the at least one window structure including a moveable first window and a moveable second window, said moveable first window initially positioned at an opening in the end of the discharge tube for sealing the discharge tube and for transmitting the laser beam, said moveable second window being initially away from the opening and unexposed to the gas mixture, wherein said window structure is configured such that said moveable second window is movable into position at the opening for sealing the discharge tube and transmitting the beam when the first window is moved away from the opening; and
   a valve positioned at the opening in the end of the discharge tube and capable of maintaining a seal on said discharge tube while said first window is moved away from the opening and said second window is moved into position for sealing the discharge tube and transmitting the beam.

2. The laser system of claim 1, wherein said window structure is further configured for replacing said first window with a third window when said second window is moved into position for sealing the discharge tube and transmitting the beam.

3. The laser system of claim 1, wherein said valve comprises a gate valve.

4. The laser system of claim 1, further comprising a gas handling unit for replenishing the gas mixture during laser operation and increasing a lifetime of the gas mixture.

5. The laser system of claim 4, wherein the gas handling unit provides micro-halogen injections including an amount of halogen less than 3 milliliters into the discharge tube for replenishing the halogen in the gas mixture without substantially affecting parameters of the laser beam.

6. The laser system of claim 5, wherein the gas handling unit further releases a portion of the gas mixture from the discharge tube in conjunction with the micro-halogen injections.

7. The laser system of claim 1, further comprising an additional gas volume having fluid communication with the gas mixture for increasing a total gas volume and a lifetime of the gas mixture.

8. The laser system of claim 7, further comprising a plurality of components arranged in a gas circulation loop including the window structure and configured for drawing a flow of the gas mixture from the discharge tube and through said plurality of components, and further configured for flowing filtered gas past the first window for preventing contaminants within the discharge tube from depositing on the window.

9. The laser system of claim 8, wherein the plurality of components forming the gas circulation loop include a labyrinth filter.

10. The laser system of claim 8, wherein the window structure further includes a baffle structure.

11. The laser system of claim 7, wherein said window structure is further configured for replacing said first window with a third window when said second window is moved into position for sealing the discharge tube and transmitting the beam.

12. The laser system of claim 11, wherein said valve is capable of maintaining a seal on said discharge tube when said third window is moved into position for sealing the discharge tube and transmitting the beam.

13. The laser system of claim 1, further comprising a plurality of components arranged in a gas circulation loop including the window structure and configured for drawing a flow of the gas mixture from the discharge tube and through said plurality of components, and further configured for flowing filtered gas past the first window for preventing contaminants within the discharge tube from depositing on the first window.

14. The laser system of claim 13, wherein the plurality of components forming the gas circulation loop include a labyrinth filter.

15. The laser system of claim 13, wherein the window structure further includes a baffle structure.

16. The laser system of claim 13, further comprising a gas handling unit for replenishing the gas mixture during laser operation and increasing a lifetime of the gas mixture.

17. The laser system of claim 16, wherein the gas handling unit provides micro-halogen injections including an amount of halogen less than 3 milliliters into the discharge tube for replenishing the halogen in the gas mixture without substantially affecting parameters of the laser beam.

18. The laser system of claim 17, wherein the gas handling unit further releases a portion of the gas mixture from the discharge tube in conjunction with the micro-halogen injections.

19. The laser system of claim 18, wherein the plurality of components forming the gas circulation loop include a labyrinth filter.

20. The laser system of claim 19, wherein the plurality of components forming the gas circulation loop further include a particulate filter.

21. The laser system of claim 1, wherein said window structure is configured such that said second window is translatable into position for sealing the discharge tube and transmitting the beam when the first window becomes contaminated.

22. The laser system of claim 21, wherein said window structure is further configured for replacing said first window with a third window when said second window is moved into position for sealing the discharge tube and transmitting the beam.

23. The laser system of claim 21, wherein said valve is a gate valve.

24. The laser system of claim 21, further comprising a plurality of components arranged in a gas circulation loop including the window structure and configured for drawing a flow of the gas mixture from the discharge tube and through said plurality of components, and further configured for flowing filtered gas past the first window for preventing contaminants within the discharge tube from depositing on the first window.

25. The laser system of claim 21, further comprising a gas handling unit for replenishing the gas mixture during laser operation and increasing a lifetime of the gas mixture.

26. The laser system of claim 1, wherein said window structure is configured to be rotatable such that said second window is movable into position for sealing the discharge tube and transmitting the beam when the first window becomes contaminated.

27. The laser system of claim 26, wherein said window structure is further configured for replacing said first window with a third window when said second window is moved into position for sealing the discharge tube and transmitting the beam.

28. The laser system of claim 26, wherein said valve is a gate valve.

29. The laser system of claim 26, further comprising a plurality of components arranged in a gas circulation loop including the window structure and configured for drawing a flow of the gas mixture from the discharge tube and through said plurality of components, and further configured for flowing filtered gas past the first window for preventing contaminants within the discharge tube from depositing on the first window.

30. The laser system of claim 26, further comprising a gas handling unit for replenishing the gas mixture during laser operation and increasing a lifetime of the gas mixture.

31. A high power excimer or molecular fluorine laser system for industrial processing, comprising:

a resonator including therein a discharge tube filled with a gas mixture;

a plurality of electrodes within the discharge tube and connected to a pulsed discharge circuit for energizing the gas mixture and generating a laser beam in the resonator;

at least one window structure positioned at an end of the discharge tube, the at least one window structure including a moveable first window and a moveable second window, said moveable first window initially positioned at an opening in the end of the discharge tube for sealing the discharge tube and for transmitting the laser beam, said moveable second window being initially away from the opening and unexposed to the gas mixture, wherein said window structure is configured such that said moveable second window is movable into position at the opening for sealing the discharge tube and transmitting the beam when the first window is moved away from the opening;

a valve positioned at the opening in the end of the discharge tube and capable of maintaining a seal on said discharge tube while said first window is moved away from the opening and said second window is moved into position for sealing the discharge tube and transmitting the beam; and a gas circulation loop located outside the discharge tube and having an inlet and an outlet adjacent the at least one window structure in the discharge tube, the gas circulation loop containing a pump configured for drawing a flow of the gas mixture from the discharge tube and through a filter for filtering the gas mixture such that a filtered gas mixture can be flowed back into the discharge tube near the window structure in order to prevent contaminants within the discharge tube from depositing on the window structure.

32. The laser system of claim 31, further comprising gas mixture contamination suppression means for suppressing contaminant build-up in the gas mixture, such that a lifetime of said gas mixture is increased.

33. The laser system of claim 31, wherein the gas circulation loop includes a labyrinth filter.

34. The laser system of claim 33, wherein the gas circulation loop further includes a particulate filter.

35. The laser system of claim 32, wherein said gas mixture contamination suppression means includes a gas handling unit for replenishing the gas mixture during laser operation.

36. The laser system of claim 35, wherein the gas handling unit provides micro-halogen injections including an amount of halogen less than 3 milliliters into the discharge tube for replenishing the halogen in the gas mixture without substantially affecting parameters of the laser beam.

37. The laser system of claim 36, wherein the gas handling unit further releases a portion of the gas mixture from the discharge tube in conjunction with the micro-halogen injections.

38. The laser system of claim 35, wherein said gas mixture contamination suppression means includes an additional gas volume having fluid communication with the gas mixture for increasing a total gas volume and a lifetime of the gas mixture.

39. The laser system of claim 32, wherein said gas mixture contamination suppression means includes an additional gas volume having fluid communication with the gas mixture for increasing a total gas volume and a lifetime of the gas mixture.

40. The laser system of claim 39, wherein said additional gas volume has a volume of at least 50% of a volume of said gas mixture within said discharge tube, for increasing a gas mixture lifetime by at least substantially 50%.

41. The laser system of claim 39, wherein said additional gas volume and said laser tube are coupled together by an inlet port and an outlet port for flowing gas from said additional gas volume into said discharge chamber and from said discharge chamber to said additional gas volume.

42. The laser system of claim 41, wherein a contaminant concentration within said additional gas volume is approximately that within said gas mixture within said discharge tube.

43. A method generating an excimer or molecular fluorine laser beam such that the laser system generating the beam has an increased interval between laser servicing procedures such that laser system downtime is reduced and industrial throughput is increased, comprising the steps of:

operating the laser for generating the laser beam which transmits through a first window on a discharge tube of the laser, and wherein the first window is exposed to a gas mixture within the discharge tube;

closing a gate valve adjacent the first window on the discharge tube in order to contain the gas mixture in the discharge tube; and moving said first window and replacing said first window with a second window which is initially unexposed to the gas mixture, and wherein said second window is moved into position for sealing the discharge tube and transmitting the beam when the first window becomes contaminated, and wherein the gate valve is opened after the second window is moved into position;

wherein an interval between laser servicing procedures is increased due to the moving into position of the second window when the first window becomes contaminated, such that laser system downtime is reduced and industrial throughput is increased.

* * * * *